(12) United States Patent
Hupfeld et al.

(10) Patent No.: US 11,220,942 B2
(45) Date of Patent: Jan. 11, 2022

(54) SYSTEM AND METHOD FOR EXHAUST-GAS AFTERTREATMENT OF AN INTERNAL COMBUSTION ENGINE

(71) Applicant: VOLKSWAGEN AKTIENGESELLSCHAFT, Wolfsburg (DE)

(72) Inventors: Bernd Hupfeld, Gifhorn (DE); Falk-Christian Baron Von Ceumern-Lindenst Jerna, Braunschweig (DE); Stefan Paukner, Wolfsburg (DE)

(73) Assignee: VOLKSWAGEN AKIIHNGESELLSCHAFT, Wolfsburg (DE)

(*) Notice: Subject to any disclaimer, the term of this patent is extended or adjusted under 35 U.S.C. 154(b) by 55 days.

(21) Appl. No.: 16/623,585

(22) PCT Filed: Jun. 14, 2018

(86) PCT No.: PCT/EP2018/065772
§ 371 (c)(1),
(2) Date: Dec. 17, 2019

(87) PCT Pub. No.: WO2018/234141
PCT Pub. Date: Dec. 27, 2018

(65) Prior Publication Data
US 2020/0116061 A1    Apr. 16, 2020

(30) Foreign Application Priority Data

Jun. 19, 2017  (DE) .................... 10 2017 113 366.6

(51) Int. Cl.
*F01N 3/02* (2006.01)
*F01N 3/10* (2006.01)
(Continued)

(52) U.S. Cl.
CPC ....... *F01N 3/2013* (2013.01); *B01D 53/9454* (2013.01); *B60N 2/002* (2013.01);
(Continued)

(58) Field of Classification Search
CPC ........ F01N 1/14; F01N 3/2013; F01N 3/0835; F01N 3/101; F01N 3/32; F01N 3/103;
(Continued)

(56) References Cited

U.S. PATENT DOCUMENTS 5,551,231 A * 9/1996 Tanaka ................... F01N 3/0842
60/289
5,804,148 A * 9/1998 Kanesaka ................. F01N 9/00
422/174

(Continued)

FOREIGN PATENT DOCUMENTS

CN    1336981 A    2/2002
CN    102635426 A  8/2012
(Continued)

OTHER PUBLICATIONS

Machine Translation DE-102012021573-A1 (Year: 2021).*
(Continued)

*Primary Examiner* — Audrey B. Walter
*Assistant Examiner* — Dapinder Singh
(74) *Attorney, Agent, or Firm* — Pearl Cohen Zedek Latzer Baratz LLP

(57) ABSTRACT

The invention relates to an exhaust gas aftertreatment system for a spark ignition internal combustion engine based on the Otto principle. The internal combustion engine is connected on the outlet side to an exhaust gas system, wherein an electrically heatable three-way catalytic converter, a four-way catalytic converter downstream from the electrically heatable three-way catalytic converter, and a further three-way catalytic converter downstream from the four-
(Continued)

way catalytic converter are situated in the exhaust gas system in the flow direction of an exhaust gas through the exhaust gas system. Before the internal combustion engine is started, the electrically heatable three-way catalytic converter and preferably also the four-way catalytic converter are heated to allow efficient exhaust gas aftertreatment of the untreated emissions of the internal combustion engine upon starting the internal combustion engine. The exhaust gas aftertreatment system is also configured to allow efficient conversion of the pollutants also during a regeneration of the four-way catalytic converter, and thus, to ensure particularly low emissions in all operating states of the motor vehicle.

8 Claims, 3 Drawing Sheets

(51) Int. Cl.
*F01N 3/20* (2006.01)
*B01D 53/94* (2006.01)
*B60N 2/00* (2006.01)
*B60R 22/48* (2006.01)
*F01N 3/08* (2006.01)
*F01N 11/00* (2006.01)
*F01N 3/32* (2006.01)
*F02D 41/02* (2006.01)
*B60R 25/24* (2013.01)
*B60W 20/00* (2016.01)

(52) U.S. Cl.
CPC ............ *B60R 22/48* (2013.01); *F01N 3/0835* (2013.01); *F01N 3/101* (2013.01); *F01N 3/32* (2013.01); *F01N 11/007* (2013.01); *F02D 41/0255* (2013.01); *B60R 25/24* (2013.01); *B60R 2022/4808* (2013.01); *B60W 20/00* (2013.01); *F02D 2200/0802* (2013.01)

(58) Field of Classification Search
CPC ... F01N 3/30; F01N 3/34; F01N 3/021; F01N 11/007; F01N 13/009; F01N 2240/04; F01N 2240/16; B01D 53/9454; B60N 2/002; B60R 22/48; B60R 25/24; B60R 2022/4808; F02D 41/0255; F02D 2200/0802; B60W 20/00; Y02T 10/12; Y02A 50/20

USPC ......... 60/273, 274, 286, 295, 297, 299–301, 60/311

See application file for complete search history.

(56) References Cited

U.S. PATENT DOCUMENTS

| | | | |
|---|---|---|---|
| 2002/0011069 | A1 | 1/2002 | Maus et al. |
| 2003/0127072 | A1* | 7/2003 | Gmelin .................. F02M 69/34 123/431 |
| 2004/0266285 | A1* | 12/2004 | Kanno .................. F02D 31/007 440/84 |
| 2011/0258986 | A1* | 10/2011 | Fath ........................ F01N 3/025 60/274 |
| 2012/0204536 | A1 | 8/2012 | Gonze et al. |
| 2013/0327023 | A1 | 12/2013 | Schluter et al. |
| 2014/0311123 | A1* | 10/2014 | Gonze ....................... F01N 9/00 60/274 |
| 2015/0107228 | A1 | 4/2015 | Klingmann et al. |
| 2017/0014766 | A1 | 1/2017 | Schoenhaber et al. |
| 2017/0248540 | A1* | 8/2017 | Nees .................. H01M 4/8892 |

FOREIGN PATENT DOCUMENTS

| | | | | |
|---|---|---|---|---|
| CN | 205064049 U | | 3/2016 | |
| CN | 106321204 A | | 1/2017 | |
| DE | 10 2012 011 603 A1 | | 12/2013 | |
| DE | 102012021573 A1 | * | 5/2014 | ............... F23G 7/07 |
| DE | 10 2015 212 846 A1 | | 1/2017 | |
| DE | 10 2015 219 114 A1 | | 4/2017 | |
| EP | 2 650 042 A1 | | 10/2013 | |
| EP | 3 115 566 A1 | | 1/2017 | |
| JP | H 0579320 A | | 3/1993 | |
| WO | WO 2015/135983 A1 | | 9/2015 | |

OTHER PUBLICATIONS

Search report for German Patent Application No. 10 2017 113 366.6, dated Apr. 6, 2018.
International Search Report of PCT Application No. PCT/EP2018/065772, dated Jul. 30, 2018.
Office Action for Chinese Patent Application No. 201880040750.8, dated Mar. 2, 2021.

* cited by examiner

SYSTEM AND METHOD FOR EXHAUST-GAS AFTERTREATMENT OF AN INTERNAL COMBUSTION ENGINE

CROSS-REFERENCE TO RELATED APPLICATIONS

This application is a National Phase Application of PCT International Application No. PCT/EP2018/065772, International Filing Date Jun. 14, 2018, claiming priority of German Patent Application No. 10 2017 113 366.6, filed Jun. 19, 2017, which is hereby incorporated by reference.

FIELD OF THE INVENTION

The invention relates to an exhaust gas aftertreatment system for exhaust gas aftertreatment of the exhaust gases of an internal combustion engine, and a method for exhaust gas aftertreatment of an internal combustion engine according to the preamble of the independent claims.

BACKGROUND OF THE INVENTION

The increasing stringency of current and future exhaust emission regulations is placing high demands on uncontrolled engine emissions and the exhaust gas aftertreatment of internal combustion engines. The requirements for further decreases in fuel consumption and the continual tightening of exhaust emission standards with regard to allowable nitrogen oxides emissions pose a challenge for engine developers. For diesel engines, exhaust gas aftertreatment systems are currently in use which have an oxidation catalytic converter, a catalytic converter for selective catalytic reduction of nitrogen oxides (SCR catalytic converter), a particulate filter for separating soot particles, and optionally further catalytic converters.

Various exhaust gas aftertreatment systems having three-way catalytic converters and four-way catalytic converters are used in gasoline engines. For example, a concept is known in which a three-way catalytic converter close to the engine is combined with a four-way catalytic converter in the underbody position of the motor vehicle, it being possible to additionally blow secondary air into the exhaust duct of the internal combustion engine, downstream from the three-way catalytic converter and upstream from the four-way catalytic converter. Although such an exhaust gas aftertreatment system provides for very efficient conversion of harmful exhaust gas components and minimizes the emissions during normal operation, in certain operating situations of the internal combustion engine, in particular in a cold start phase of the internal combustion engine or during a regeneration of the four-way catalytic converter, it is possible that not all harmful exhaust gas components are converted, resulting in an increase in the tailpipe emissions.

An exhaust gas system for a spark ignition internal combustion engine is known from DE 10 2012 011 603 A1, in which an HC adsorber for temporarily storing unburned hydrocarbons is situated between a pre-catalytic converter close to the engine and a main catalytic converter. A burner is situated downstream from the HC adsorber and upstream from the main catalytic converter in order to heat the catalytic converter very quickly, after the internal combustion engine is started, to an operating temperature in which catalytic conversion of the pollutants contained in the exhaust gas is possible by means of the main catalytic converter. The HC adsorber, in particular at cold exhaust gas temperatures, can temporarily store unburned hydrocarbons, which are then discharged from the HC adsorber at higher exhaust gas temperatures. Therefore, the burner must be designed in such a way that the main catalytic converter has reached its light-off temperature before thermally induced discharge of the unburned hydrocarbons from the HC adsorber occurs.

A device for exhaust gas aftertreatment of a spark ignition internal combustion engine is known from DE 10 2015 212 846 A1, in which at least a three-way catalytic converter, a NOx storage catalytic converter, and a particulate filter are situated in the exhaust duct, wherein secondary air is blown into the exhaust duct, downstream from the three-way catalytic converter and upstream from the NOx storage catalytic converter and the particulate filter, in order to simultaneously allow desulfurization of the NOx storage catalytic converter and a regeneration of the particulate filter, and thus to limit the period of time in which the untreated emissions of the internal combustion engine are increased.

Even when the methods known from the prior art result in an improvement in the exhaust gas emissions, there is still further potential for improvement in order to reduce the emissions.

SUMMARY OF THE INVENTION

The object of the invention is to propose an exhaust gas aftertreatment system for a gasoline engine which in all operating situations ensures conversion of harmful exhaust gas components with maximum efficiency, and also converts other pollutant components such as nitrous oxide ($N_2O$) or ammonia ($NH_3$), which currently are not subject to emission limits.

According to the invention, this object is achieved by an exhaust gas aftertreatment system for a spark ignition internal combustion engine based on the Otto principle, in which in an exhaust gas system that is connected to an outlet of the internal combustion engine, an electrically heatable three-way catalytic converter close to the engine, downstream from the outlet, a four-way catalytic converter downstream from the electrically heatable three-way catalytic converter, and a further three-way catalytic converter downstream from the four-way catalytic converter are situated, wherein a secondary air system is provided in the exhaust gas system via which secondary air may be blown into the exhaust gas system upstream from the electrically heatable three-way catalytic converter. A "position close to the engine" is understood to mean an average exhaust gas path of at most 50 cm, in particular of at most 30 cm, downstream from the outlet of the internal combustion engine. Due to the electrically heatable three-way catalytic converter, the catalytic converter may be heated to a light-off temperature when, or even before, the internal combustion engine is started. The cold start emissions may thus be significantly improved, since an effective conversion of the exhaust gas components subject to emission limits is possible upon starting the internal combustion engine or immediately afterward. Secondary air is blown into the exhaust duct, upstream from the electrically heatable three-way catalytic converter, to convectively transfer heat from the heating disk to the three-way catalytic converter. As a result of the improved lambda control and rapid heatup of the catalytic converter, it is also possible to reduce the $NH_3$ and $N_2O$ emissions.

Advantageous refinements and enhancements of the exhaust gas aftertreatment system stated in the independent claim are possible as a result of the features set forth in the dependent claims.

In one preferred embodiment of the invention, it is provided that a burner is provided in the exhaust gas system, downstream from the electrically heatable three-way catalytic converter and upstream from the four-way catalytic converter, via which the four-way catalytic converter is heatable. By use of a burner, the four-way catalytic converter may be heated in addition to the exhaust gas stream, and may thus be heated to a light-off temperature shortly after the internal combustion engine is started. The burner has an output of preferably at least at least 2 kW, particularly preferably at least 5 kW, in particular greater than 10 kW. Much quicker heating is thus possible compared to an electric heating element; in addition, the exhaust gas of the burner provides for convective heat transfer, so that the entire four-way catalytic converter may be heated to a light-off temperature very quickly and may thus contribute to efficient conversion of pollutants subject to emission limits. The burner can generate a much higher heat output than an electric heating element, and can thus more quickly heat a catalytic converter to a light-off temperature. Alternatively, the burner may be activated shortly before the internal combustion engine is started.

In another preferred embodiment of the invention, it is provided that an HC adsorber is situated in the exhaust gas system, downstream from the electrically heatable three-way catalytic converter and upstream from the four-way catalytic converter. If the electrically heatable three-way catalytic converter has not yet reached its light-off temperature immediately after a cold start of the internal combustion engine, in this first phase after the cold start, unburned hydrocarbons cannot yet be efficiently converted by the electrically heatable three-way catalytic converter. At low exhaust gas temperatures, in particular at an exhaust gas temperature below a threshold temperature, these hydrocarbons are taken in by the HC adsorber, and above this threshold temperature they are discharged from the HC adsorber. For this purpose, a zeolite that acts as a molecular sieve is situated on the HC adsorber. This zeolite stores unburned hydrocarbons at low exhaust gas temperatures, at which the catalytic converters have not yet reached their light-off temperature. When the HC adsorber exceeds a threshold temperature, the hydrocarbons retained in the HC adsorber are released. Since the HC adsorber is situated downstream from the electrically heatable catalytic converter and upstream from the four-way catalytic converter, it is ensured that the four-way catalytic converter has reached its light-off temperature before the hydrocarbons stored in the HC adsorber desorb.

According to one preferred embodiment of the invention, it is provided that the secondary air system includes a secondary air pump and a secondary air valve, the secondary air valve being situated on the outlet side on a cylinder head of the internal combustion engine. As the result of blowing secondary air on the outlet side into the cylinder head, additional oxygen is available to the hot exhaust gas immediately after it is discharged from the cylinder. Since the exhaust gas temperature here is at a maximum in the normal case, unburned fuel components may be exothermically reacted with the additional oxygen from the secondary air.

In one advantageous enhancement of the exhaust gas aftertreatment system, it is provided that the secondary air pump is connected to the burner via a second secondary air line and a second secondary air valve. Thus, blowing fresh air into the cylinder head as well as supplying air to the burner may be ensured with only one secondary air pump. The quantity of air may be regulated via the corresponding quantity control of the secondary air pump, so that the oxygen required for regenerating the soot that is retained in the four-way catalytic converter may also be provided by the secondary air system.

Alternatively, another preferred embodiment is proposed in which a second secondary air pump is provided, via which the burner is suppliable with fresh air. As the result of a second secondary air pump for supplying the burner, the two secondary air valves may be supplied with secondary air independently of one another, so that a secondary air supply is always possible if needed.

In one preferred embodiment of the invention, it is provided that a first temperature sensor is situated downstream from an opening of the burner into an exhaust duct of the exhaust gas system and upstream from the four-way catalytic converter, and a second temperature sensor is situated downstream from the four-way catalytic converter, in particular downstream from the four-way catalytic converter and upstream from the further three-way catalytic converter. The temperature of the four-way catalytic converter may be determined in this way. Thus, if the temperature is below a temperature necessary for oxidation of the soot, and a regeneration of the four-way catalytic converter is intended, additional heating measures, in particular operation of the burner, may be easily initiated in order to heat the four-way catalytic converter to a temperature necessary for oxidation of the soot, and thus to enable a regeneration of the four-way catalytic converter. Thus, in particular also under low partial load and for short-distance operation, a regeneration of the four-way catalytic converter is possible in which an elevation of the temperature together with other known measures would only result in an insufficient temperature increase at the four-way catalytic converter. The operating range of the internal combustion engine in which regeneration of the four-way catalytic converter is possible may thus be greatly increased.

According to another enhancement of the exhaust gas aftertreatment system, it is provided that lambda sensors are situated in the exhaust duct, in each case upstream and downstream from the electrically heatable three-way catalytic converter and upstream and downstream from the four-way catalytic converter, the lambda sensors being designed as hydrolock-resistant, electrically heatable lambda sensors. The lambda sensor upstream from the electrically heatable three-way catalytic converter is preferably designed as a wideband lambda sensor, and the lambda sensor downstream from the electrically heatable three-way catalytic converter is preferably designed as a jump lambda sensor. The third lambda sensor directly upstream from the four-way catalytic converter is likewise preferably designed as a wideband lambda sensor. The fourth lambda sensor downstream from the four-way catalytic converter is preferably designed as a jump lambda sensor. The lambda sensors are preferably already electrically heated up before the internal combustion engine is started, so that the functioning of the lambda sensors is ensured immediately after the internal combustion engine is started. The regulation of the combustion air ratio of the internal combustion engine in the warmup phase of the internal combustion engine may be improved in this way.

The invention further relates to a method for exhaust gas aftertreatment of an internal combustion engine, having an exhaust gas aftertreatment system according to the invention, wherein the electrically heatable three-way catalytic converter is heated prior to or upon starting the internal combustion engine, and wherein upon starting the internal combustion engine the exhaust gas is heated by an exhaust gas burner, the heating of the electrically heatable three-way catalytic converter being started by a trigger signal of a signal generator. By use of a trigger signal of a signal generator, the catalytic converters and the lambda sensor can start to heat up even before the internal combustion engine is started, so that the catalytic converter is already preheated when the internal combustion engine is started. Alternatively, heating may also take place only upon, or shortly after, starting the internal combustion engine. It is particularly advantageous when at least one of the catalytic converters has already reached its light-off temperature when the internal combustion engine is started, and can thus contribute to an efficient exhaust gas aftertreatment after the internal combustion engine is started. For this purpose, secondary air may be blown into the exhaust duct, upstream from the electrically heatable three-way catalytic converter, to assist with convective heat transfer from the electric heating element to the catalytic structure of the electrically heatable catalytic converter. Due to the high heat output of the burner, the four-way catalytic converter may be heated to a light-off temperature in a very short time, so that the four-way catalytic converter has likewise reached its light-off temperature very soon after the internal combustion engine is started. Alternatively, it is possible to design the electrically heatable three-way catalytic converter close to the engine with a small catalyst volume so that rapid heating of the electrically heatable three-way catalytic converter is possible.

In one preferred embodiment of the method, it is provided that the signal generator for the trigger signal is a door contact switch, a sensor for seat occupancy, in particular for occupancy of the driver's seat, a receiver for a keyless locking system of a motor vehicle, a seat belt sensor, or a control unit of a hybrid vehicle. To achieve the longest possible lead time for heating up the catalytic converters, it is meaningful for the heating to be initiated by a trigger signal which is well before the starting of the internal combustion engine. Assuming, for example, that 20-30 s elapse between the driver approaching the motor vehicle and starting the internal combustion engine, the signal of a receiver for a keyless locking system, for example a central locking system or a keyless go system, or a door contact switch of the motor vehicle is suitable for a trigger signal. Alternatively, in a hybrid vehicle, heating of the catalytic converter may be triggered by a control unit of the hybrid drive when the state of charge (SOC) of the battery signals a rapid switch from purely electrical operation to operation using the internal combustion engine. Alternatively, other sensors, such as sensors for recognizing occupancy of the driver's seat or a seat belt sensor, may be used to recognize an imminent start of the internal combustion engine and to initiate the preheating of the catalytic converters and lambda sensors. In addition, in such a system the starting of the internal combustion engine may be blocked by the control unit until the catalytic converters have reached a required minimum temperature.

Unless stated otherwise in the individual case, the various embodiments described in the present patent application may advantageously be combined with one another.

BRIEF DESCRIPTION OF THE DRAWINGS

The invention is explained below in exemplary embodiments, with reference to the associated drawings. Identical components or components having the same function are denoted by the same reference numerals. In the figures.

DETAILED DESCRIPTION OF THE INVENTION

Figure 1:
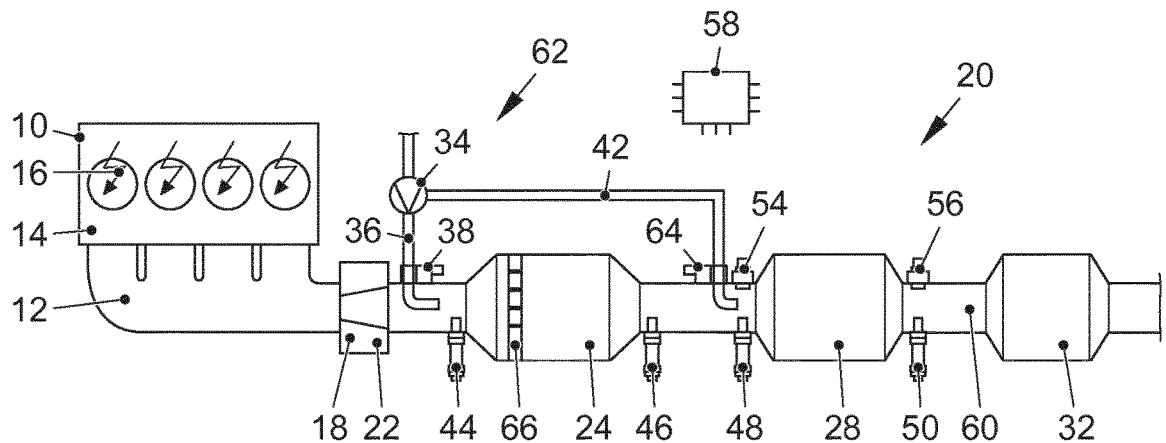
FIG. 1 shows a first exemplary embodiment of an exhaust gas aftertreatment system according to the invention for a spark ignition internal combustion engine.

FIG. 1 illustrates a first exemplary embodiment of an exhaust gas aftertreatment system according to the invention for an internal combustion engine 10. The internal combustion engine 10 is designed as a spark ignition internal combustion engine 10, preferably as an internal combustion engine 10, based on the Otto principle, that is spark-ignited by means of spark plugs 16. An exhaust gas system 20 is connected to an outlet 12 of the internal combustion engine 10. In the exhaust gas system 20, a turbine 22 of an exhaust gas turbocharger 18 is situated downstream from the outlet 12 of the internal combustion engine 10, and an electrically heatable three-way catalytic converter 24 close to the engine is situated downstream from the turbine 22, in the flow direction of an exhaust gas through the exhaust gas system 20. The electrically heatable three-way catalytic converter 24 has an electric heating element, preferably an electric heating disk 66, that is preferably situated on the electrically heatable three-way catalytic converter 24 on the inlet side. A four-way catalytic converter 28, i.e., a particulate filter having a three-way catalytically active coating, is situated downstream from the electrically heatable three-way catalytic converter 24, and a further three-way catalytic converter 32 is situated farther downstream. Provided in the exhaust gas system 20 is a secondary air system 62 with a secondary air pump 34, via which fresh air may be introduced into an exhaust duct 60 of the exhaust gas system 20 at a first inlet point upstream from the electrically heatable three-way catalytic converter 24 via a first secondary air valve 38, and at a second inlet point downstream from the electrically heatable three-way catalytic converter 24 and upstream from the four-way catalytic converter 28 via a second secondary air valve 64. The two secondary air valves 38, 64 are connected to the secondary air pump 34 via two secondary air lines 36, 42, respectively. Situated upstream from the electrically heatable three-way catalytic converter 24 is a first lambda sensor 44, preferably a wideband lambda sensor, with which the combustion air ratio $\lambda$ of the internal combustion engine 10 may be adjusted. Situated in the exhaust duct 60, downstream from the electrically heatable three-way catalytic converter 24 and upstream from the second secondary air valve 64, is a second lambda sensor 46, in particular a jump lambda sensor, for correcting the deviations of the lambda control via the wideband lambda sensor 44 and ensuring proper functioning of the electrically heatable three-way catalytic converter 24. Situated downstream from the second inlet point and upstream from the four-way catalytic converter 28 is a third lambda sensor 48, in particular a further wideband lambda sensor, for determining the exhaust gas-air ratio that flows across the four-way catalytic converter 28, in particular when fresh air is blown into the exhaust duct 60 through the second secondary air valve 64. Situated downstream from the four-way catalytic converter 28 is a fourth lambda sensor 50, in particular a further jump lambda sensor, for checking the functioning of the four-way catalytic converter 28. Situated in the exhaust duct 60, downstream from the second secondary air valve 64 and upstream from the four-way catalytic converter 28, is a first temperature sensor 54 with which an inlet temperature of the exhaust gas before it enters the four-way catalytic converter 28 may be determined. Provided downstream from the four-way catalytic converter 28 and upstream from the further three-way catalytic converter 32 is a further temperature sensor 56 with which an exhaust gas temperature downstream from the four-way catalytic converter 28 may be determined. The exhaust gas aftertreatment system also has a control unit 58, in particular a control unit 58 of the internal combustion engine 10, via which the signals of the lambda sensors 44, 46, 48, 50 and of the temperature sensors 54, 56 may be processed, and the combustion air ratio λ of the internal combustion engine 10, in particular the fuel quantity, and the secondary air quantities supplied to the exhaust duct 60 via the secondary air valves 38, 64, may be regulated.

Figure 2:
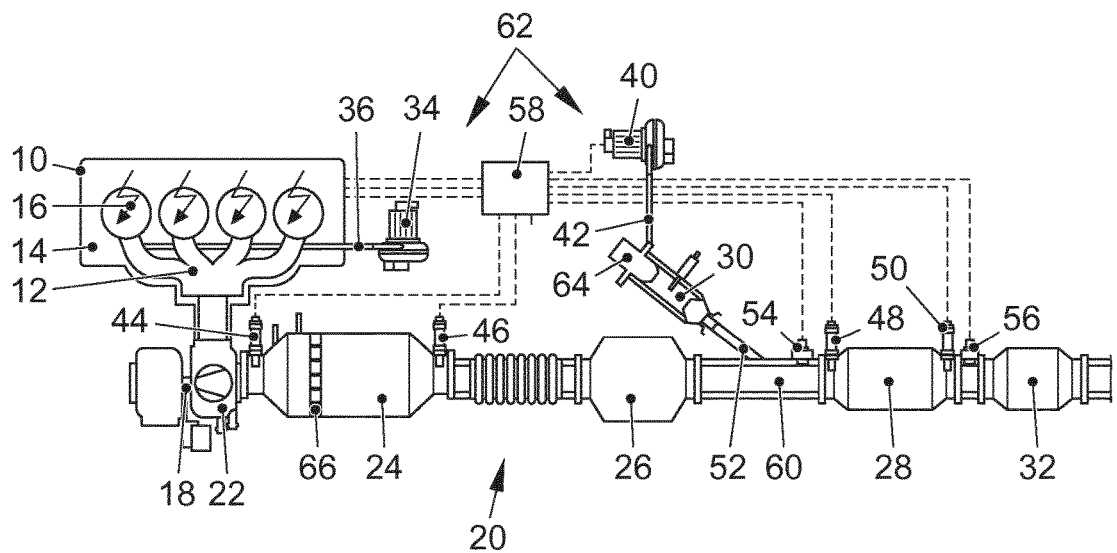
FIG. 2 shows a preferred exemplary embodiment of an exhaust gas aftertreatment system according to the invention for a spark ignition internal combustion engine.

FIG. 2 illustrates one preferred exemplary embodiment of an exhaust gas aftertreatment system according to the invention for a spark ignition internal combustion engine 10. In the exhaust gas system 20 of the internal combustion engine 10, an electrically heatable three-way catalytic converter 24 close to the engine, an HC adsorber 26 downstream from the electrically heatable three-way catalytic converter 24, a four-way catalytic converter 28 farther downstream, and a further three-way catalytic converter 32 downstream from the four-way catalytic converter 28 are situated in the flow direction of an exhaust gas of the internal combustion engine 10 through the exhaust gas system 20. The electrically heatable three-way catalytic converter 24 may be heated by a heating disk 66. The four-way catalytic converter 28 is heatable by a burner 30 that opens into the exhaust duct 60 of the exhaust gas system 20 at an opening 52 downstream from the HC adsorber 26 and upstream from the four-way catalytic converter 28. The exhaust gas aftertreatment system also includes a secondary air system 62 having a first secondary air pump 34 that is connected to a cylinder head 14 of the internal combustion engine 10 via a first secondary air line 36. Fresh air in the area of the outlet 12 directly downstream from the exhaust valves of the internal combustion engine 10 may be introduced into the hot exhaust gas via the first secondary air line 36 to facilitate an exothermic reaction of the unburned fuel components. In the exhaust gas system 20, an exhaust gas turbocharger 18 together with a turbine 22 may preferably be situated upstream from the electrically heatable three-way catalytic converter 24. Situated directly upstream from the electrically heatable three-way catalytic converter 24 is a first lambda sensor 44, preferably a wideband lambda sensor, with which the combustion air ratio λ that flows across the electrically heatable three-way catalytic converter 24 may be determined. Situated directly downstream from the electrically heatable three-way catalytic converter 24 is a further lambda sensor 46, in particular a jump lambda sensor, with which the functioning of the electrically heatable three-way catalytic converter 24 may be monitored and a rich or lean breakthrough through the electrically heatable three-way catalytic converter 24 may be detected.

In addition, the secondary air system 62 has a second secondary air pump 40 that is connected to a secondary air valve 64 on the burner 30 via a second secondary air line 42. A third lambda sensor 48 and a first temperature sensor 54 are provided directly upstream from the four-way catalytic converter 28, via which the exhaust gas-air ratio flowing across the four-way catalytic converter 28 may be determined and the burner 30 may be correspondingly controlled. A fourth lambda sensor 50 and a second temperature sensor 56 are provided downstream from the four-way catalytic converter 28.

Figure 3:
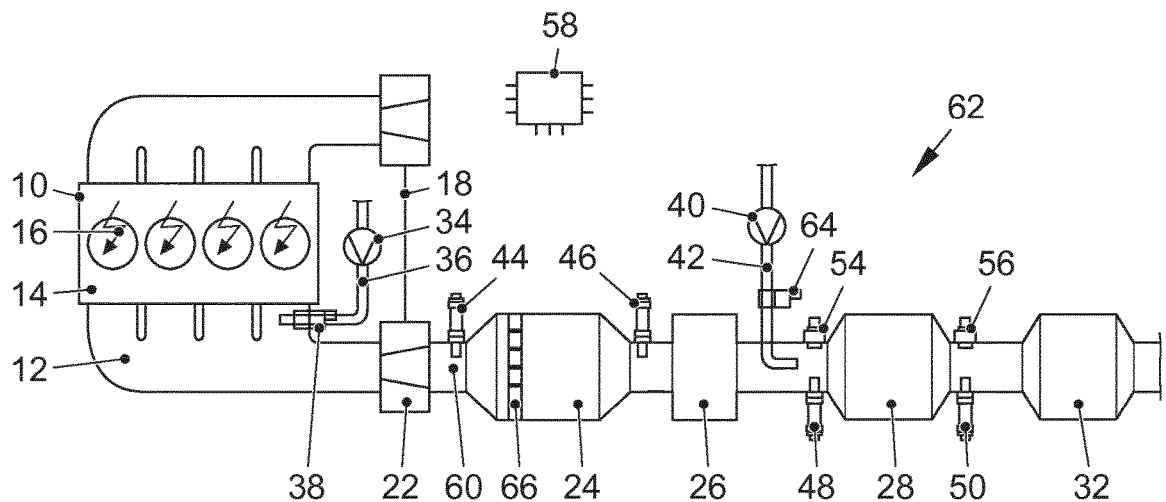
FIG. 3 shows another exemplary embodiment of an exhaust gas aftertreatment system according to the invention for a spark ignition internal combustion engine.

FIG. 3 illustrates another exemplary embodiment of an exhaust gas aftertreatment system according to the invention for an internal combustion engine 10. The design is essentially the same as in FIG. 1; only the differences from the first exemplary embodiment are discussed below. The secondary air pump 34 is connected to the cylinder head 14 of the internal combustion engine 10 via a secondary air line 36; situated on the cylinder head is a secondary air valve 38 via which the secondary air on the outlet side directly downstream from the exhaust valves of the internal combustion engine 10 may be blown into the cylinder head. Also situated downstream from the electrically heatable three-way catalytic converter 24 and upstream from the four-way catalytic converter 28 is an HC adsorber, via which unburned hydrocarbons may be temporarily stored when the exhaust gas is cold, and may be delivered back to the exhaust gas when the exhaust gas is hot. Also provided is a second secondary air pump 40 that is connected to a second secondary air valve 64 via a second secondary air line 42, the second secondary air valve 64 being connected to an inlet point via which fresh air may be blown into the exhaust duct 60 downstream from the HC adsorber 26 and upstream from the four-way catalytic converter 28.

Figure 4:
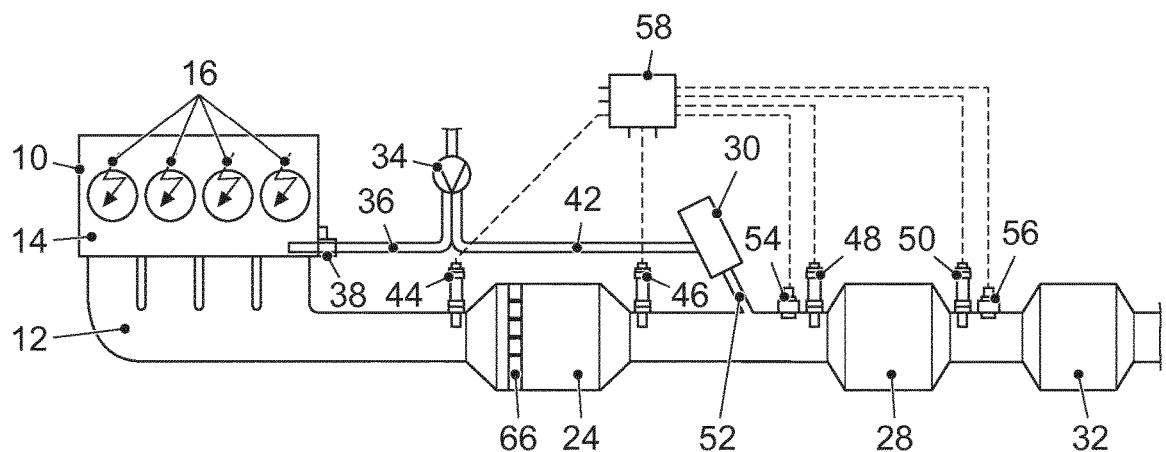
FIG. 4 shows another exemplary embodiment of an exhaust gas aftertreatment system according to the invention for a spark ignition internal combustion engine, wherein the burner and the outlet are supplied with fresh air via a shared secondary air pump.

FIG. 4 shows another exemplary embodiment of an exhaust gas aftertreatment system according to the invention for an internal combustion engine 10. The design is essentially the same as in FIG. 2; only the differences from the exemplary embodiment illustrated in FIG. 2 are discussed below. In comparison to the exemplary embodiment in FIG. 2, in the present exemplary embodiment the HC adsorber downstream from the electrically heatable three-way catalytic converter 24 and upstream from the four-way catalytic converter 28 is absent. This is possible due to the fact that the electrically heatable catalytic converter 24 may be heated even before the internal combustion engine 10 is started, and the four-way catalytic converter 28 is heated by the burner 30 to a light-off temperature very quickly after the internal combustion engine is started. The HC slip may thus be kept low. In addition, a shared secondary air pump 34 for blowing secondary air into the cylinder head 14 and for supplying fresh air to the burner 30 is provided in this exemplary embodiment. For this purpose, the secondary air pump 34 is connected to the first secondary air valve 38 on the cylinder head 14 of the internal combustion engine 10 via a first secondary air line 36, and is connected to a second secondary air valve 64 on the burner 30 via a second secondary air line 42. Due to the secondary air pump 34, a volumetric flow may pass through the electrically heatable catalytic converter 24 even before the internal combustion engine 10 is started, thus facilitating heating up the electrically heatable catalytic converter 24.

Figure 5:
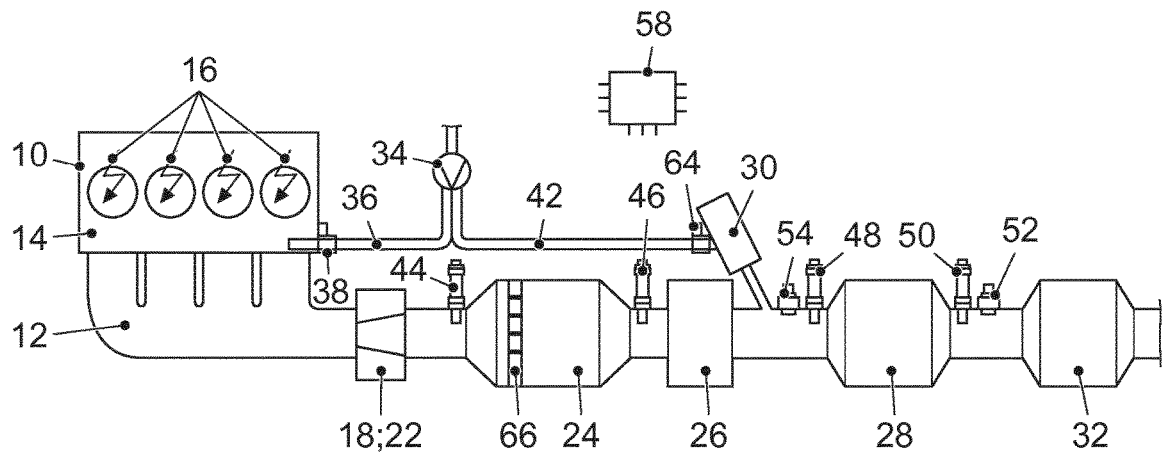
FIG. 5 shows another exemplary embodiment of a preferred exhaust gas aftertreatment system according to the invention, wherein the burner and the outlet are supplied with fresh air via a shared secondary air pump having two secondary air valves.

FIG. 5 illustrates another preferred exemplary embodiment of an exhaust gas aftertreatment system according to the invention for an internal combustion engine 10. The design is essentially the same as in FIG. 2; in the present exemplary embodiment only one secondary air pump 34 is provided, which is connected to the cylinder head 14 of the internal combustion engine 10 via a first secondary air line 36 and a first secondary air valve 38. The secondary air may thus be introduced into the outlet 12 of the internal combustion engine 10, directly downstream from the exhaust valve. The secondary air pump 34 is connected to the burner 30 via a second secondary air line 42 and a second secondary air valve 64, so that the burner 30 may likewise be supplied with fresh air by the secondary air pump 34 and the combustion air ratio of the burner 30 may be adjusted. The control of the air quantity preferably takes place via the regulation of the secondary air pump 34. In addition, the oxygen required for regenerating the soot that is retained in the four-way catalytic converter 28 may be provided by the secondary air line 42 and the burner 30, so that controlled soot burnoff on the four-way catalytic converter 28 is possible without the risk of thermal damage to the four-way catalytic converter 28.

Figure 6:
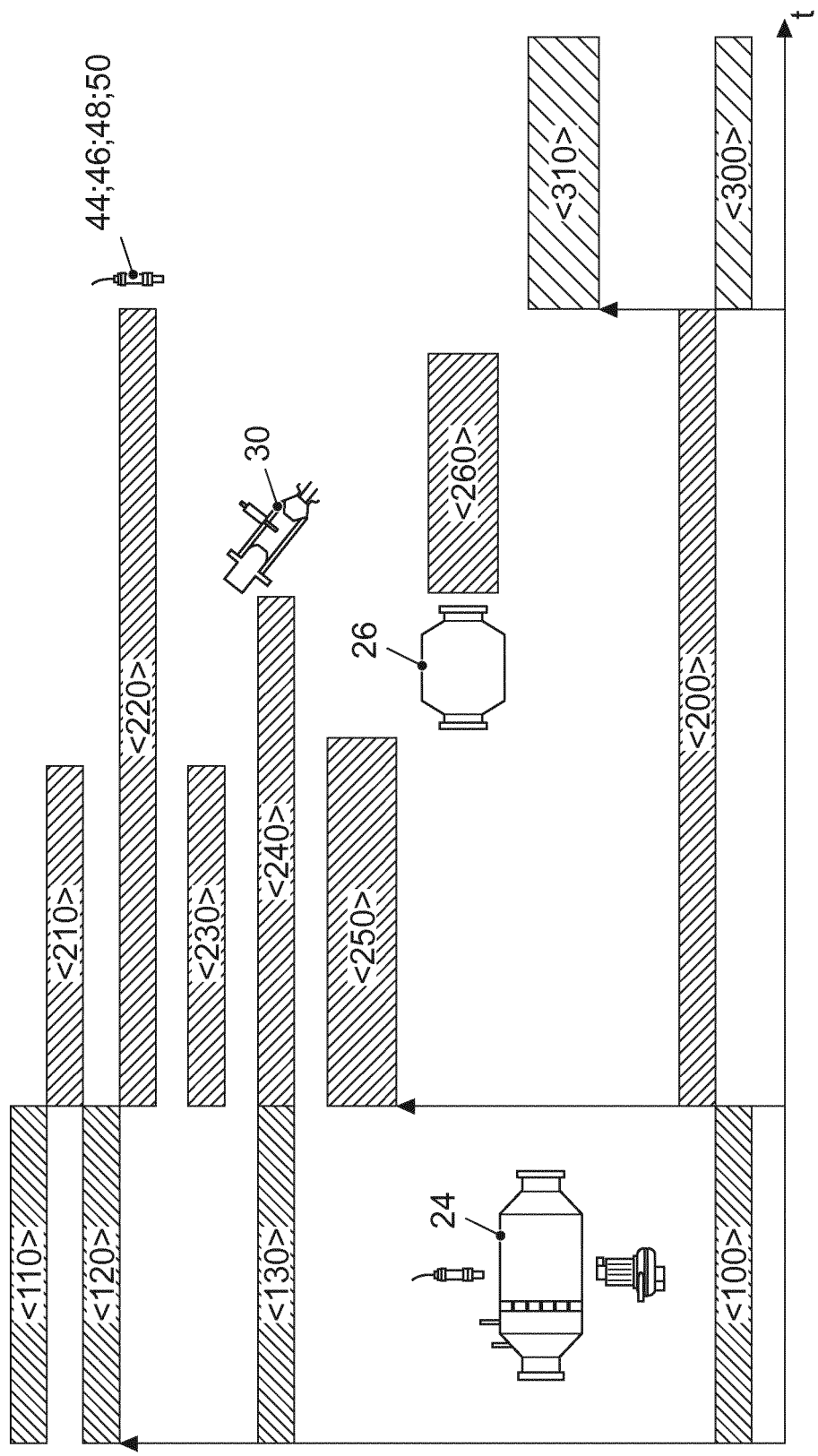
FIG. 6 shows a flow chart for heating up the exhaust gas aftertreatment system prior to and during a cold start of the internal combustion engine.

FIG. 6 illustrates a method according to the invention for exhaust gas aftertreatment of an internal combustion engine 10. The electrical heating of the heating disk 66 of the electrically heatable three-way catalytic converter 24 may be started in a prestart phase <100> in a first method step <110>. Alternatively, this may take place only upon starting the internal combustion engine 10. The preheat phase <100>, as described above, is initiated by a trigger signal of a signal generator, for example a door contact switch or a control unit of a hybrid drive. At the same time, the secondary air pump 34 may blow fresh air into the exhaust gas system 20, upstream from the electrically heatable three-way catalytic converter 24, in order to provide flow through the exhaust gas system 20 and allow convective heat transfer from the heating disk 66 to the remaining portion of the electrically heatable catalytic converter 24 when the internal combustion engine 10 is not running. Alternatively, preheating of the electrically heatable three-way catalytic converter 24 is also possible without introducing secondary air. At the same time, the lambda sensors 44, 46, 48, 50 may be heated to an operating temperature in a method step <120>. Optionally, in a method step <130>, hot gas may be introduced into the exhaust gas system 20 upstream from the four-way catalytic converter 28 by means of the burner 30 in order to likewise heat up the four-way catalytic converter before the internal combustion engine 10 is started. Blowing in of the secondary air may be ended when the internal combustion engine 10 is started. Alternatively, the electrically heatable three-way catalytic converter 24, in particular for a hybrid vehicle, may be periodically heated so that the electrically heatable three-way catalytic converter 24 is always operationally ready, even in an electric driving situation. Thus, when there is a load requirement on the internal combustion engine 10, the gaseous pollutant components may be effectively converted immediately after the engine is started.

The internal combustion engine 10 is started in a start phase <200>. The electrically heatable three-way catalytic converter 24 is actuated and the heating disk 66 is further heated in a method step <210> until a threshold temperature is reached that is preferably above the light-off temperature of the electrically heatable three-way catalytic converter 24.

In a parallel method step <220>, the combustion air ratio $\lambda$ is regulated to a stoichiometric combustion air ratio $\lambda=1$ by the lambda sensors, also during the cold start, to keep the untreated emissions as low as possible, also during the cold start. At the same time, the electrically heatable three-way catalytic converter 24 is further heated by engine-related measures, for example by adjusting the ignition angle in the retarded direction, in a method step <230>. Likewise at the same time, in a method step <240> the four-way catalytic converter 28 is heated by the burner 30 until the four-way catalytic converter has also reached a threshold temperature. The burner 30 is preferably activated upon starting the internal combustion engine 10. When the exhaust gas is cold, the unburned hydrocarbons are stored in the HC adsorber 26 in a further parallel method step <250>. When the HC adsorber 26 has reached a threshold temperature, in a method step <260> the unburned hydrocarbons stored in the HC adsorber 26 are discharged, and the HC adsorber 26 is regenerated. A change is made to normal operation <300> when the start phase <200> has concluded and the catalytic converters 24, 28, 32 have reached their operating temperature. In normal operation <300>, the internal combustion engine 10 is operated essentially with a stoichiometric combustion air ratio $\lambda=1$ in a method step <310> to ensure optimal conversion of the harmful exhaust gas components.

LIST OF REFERENCE NUMERALS 10 internal combustion engine
12 outlet
14 cylinder head
16 spark plug
18 turbocharger
20 exhaust gas system
22 turbine
24 electrically heatable three-way catalytic converter
26 HC adsorber
28 four-way catalytic converter
30 burner
32 three-way catalytic converter
34 (first) secondary air pump
36 secondary air line
38 secondary air valve
40 (second) secondary air pump
42 (second) secondary air line
44 first lambda sensor
46 second lambda sensor
48 third lambda sensor
50 fourth lambda sensor
52 opening
54 (first) temperature sensor
56 (second) temperature sensor
58 control unit
60 exhaust duct
62 secondary air system
64 (second) secondary air valve
66 heating disk

The invention claimed is:

1. An exhaust gas aftertreatment system for a spark ignition internal combustion engine, comprising:
   an exhaust gas system that is connected to an outlet of the internal combustion engine,
   an electrically heatable three-way catalytic converter disposed close to the engine, downstream from the outlet,
   a four-way catalytic converter disposed downstream from the electrically heatable three-way catalytic converter, a second three-way catalytic converter disposed downstream from the four-way catalytic converter, a secondary air system configured to blow secondary air into the exhaust gas system, upstream from the electrically heatable three-way catalytic converter, and a burner provided in the exhaust gas system disposed downstream from the electrically heatable three-way catalytic converter and disposed upstream from the four-way catalytic converter, and configured to heat the four-way catalytic converter.

2. The exhaust gas aftertreatment system according to claim 1, further comprising an HC adsorber in the exhaust gas system, downstream from the electrically heatable three-way catalytic converter and upstream from the four-way catalytic converter.

3. The exhaust gas aftertreatment system according to claim 1, wherein the secondary air system includes a secondary air pump configured to supply the burner with fresh air and a secondary air valve, the secondary air valve being situated on an outlet side on a cylinder head of the internal combustion engine.

4. The exhaust gas aftertreatment system according to claim 3, wherein the secondary air pump is connected to the burner via the second secondary air line and a second secondary air valve.

5. The exhaust gas aftertreatment system according to claim 2, further comprising:
   a first temperature sensor disposed downstream from an opening of the burner into an exhaust duct of the exhaust gas system and upstream from the four-way catalytic converter, and
   a second temperature sensor disposed downstream from the four-way catalytic converter.

6. The exhaust gas aftertreatment system according to claim 1, further comprising lambda sensors situated in the exhaust duct, in each case upstream and downstream from the electrically heatable three-way catalytic converter and upstream and downstream from the four-way catalytic converter, the lambda sensors being designed as hydrolock-resistant, electrically heatable lambda sensors.

7. A method for exhaust gas aftertreatment of an internal combustion engine, having an exhaust gas aftertreatment system comprising:
   an exhaust gas system connected to an outlet of the internal combustion engine,
   an electrically heatable three-way catalytic converter disposed close to the engine downstream from the outlet,
   a four-way catalytic converter disposed downstream from the electrically heatable three-way catalytic converter,
   a second three-way catalytic converter disposed downstream from the four-way catalytic converter,
   a secondary air system capable of blowing secondary air into the exhaust gas system upstream from the electrically heatable three-way catalytic converter, and
   a burner provided in the exhaust gas system downstream from the electrically heatable three-way catalytic converter and upstream from the four-way catalytic converter and being configured to heat the four-way catalytic converter, the method comprising:
   prior to or upon starting the internal combustion engine, starting to heat the electrically heatable three-way catalytic converter by a trigger signal provided by a signal generator, and
   activating the burner to heat up the electrically heatable three-way catalytic converter and the four-way catalytic converter to a light-off temperature as quickly as possible.

8. The method for exhaust gas aftertreatment of the internal combustion engine according to claim 7, wherein the signal generator is a door contact switch, a sensor for seat occupancy, a receiver for a keyless locking system, a seat belt sensor, or a control unit of a hybrid vehicle.

* * * * *